United States Patent [19]
Brettell et al.

[11] Patent Number: 5,163,713
[45] Date of Patent: Nov. 17, 1992

[54] ELECTRO-FUSION FITTINGS

[75] Inventors: David Brettell, South Normanton; Russell J. Kirk, Ashfield; Robin B. Carter; David M. A. Kenworthy, both of Sheffield, all of England

[73] Assignee: Fusion Group plc, Chesterfield, England

[21] Appl. No.: 517,725

[22] Filed: May 2, 1990

[30] Foreign Application Priority Data

May 3, 1989 [GB] United Kingdom ............... 8910070

[51] Int. Cl.⁵ .............................................. F16L 47/02
[52] U.S. Cl. ..................................... 285/21; 285/292; 285/423; 156/293; 219/544
[58] Field of Search ................ 285/21, 423, 292, 369; 156/293, 304, 274.2; 219/535, 544

[56] References Cited

U.S. PATENT DOCUMENTS

| | | |
|---|---|---|
| 3,394,952 | 7/1968 | Garrett ............................ 285/292 X |
| 3,765,979 | 10/1973 | Thomas .............................. 285/21 X |
| 3,784,239 | 1/1974 | Carter et al. ........................ 285/293 |
| 4,266,997 | 5/1981 | Lippera ................................ 156/158 |
| 4,362,684 | 12/1982 | Thalmann ........................... 285/21 X |
| 4,436,987 | 3/1984 | Thalmann et al. ................... 219/535 |
| 4,436,988 | 3/1984 | Blumenkrang .................... 285/21 X |
| 4,486,650 | 12/1984 | Bridgstock et al. ............... 285/21 X |
| 4,536,644 | 8/1985 | Thalmann .......................... 285/21 X |
| 4,602,148 | 7/1986 | Ramsey .............................. 285/21 X |
| 4,605,156 | 8/1986 | Stenger et al. .................... 285/21 X |
| 4,662,655 | 5/1987 | Fliervoet et al. ............... 285/293 X |
| 4,727,242 | 2/1988 | Barfield ............................ 285/21 X |
| 4,852,914 | 8/1989 | Lyall ..................................... 285/21 |
| 4,855,574 | 8/1989 | Lodder et al. .................... 285/21 X |
| 4,927,183 | 5/1990 | Steinmety et al. ................... 285/21 |

Primary Examiner—Randolph A. Reese
Assistant Examiner—Heather Chun
Attorney, Agent, or Firm—Watson, Cole, Grindle & Watson

[57] ABSTRACT

An electro-fusion pipe coupler includes an outer shell and an electric resistance heating coil secured therein by an intervening layer of injection moulded thermoplastic material. The coupler is made by winding the wire onto a core which consists of two separable parts, inserting the core into the tubular shell, attaching contacts to the wire ends and inserting them into holes provided in the shell, and injecting molten material into the space defined between the core and the shell to form the layer. For injecting the material the core parts define radial runners therebetween connected to a central sprue inlet and opening at respective outlets spaced around the core.

15 Claims, 5 Drawing Sheets

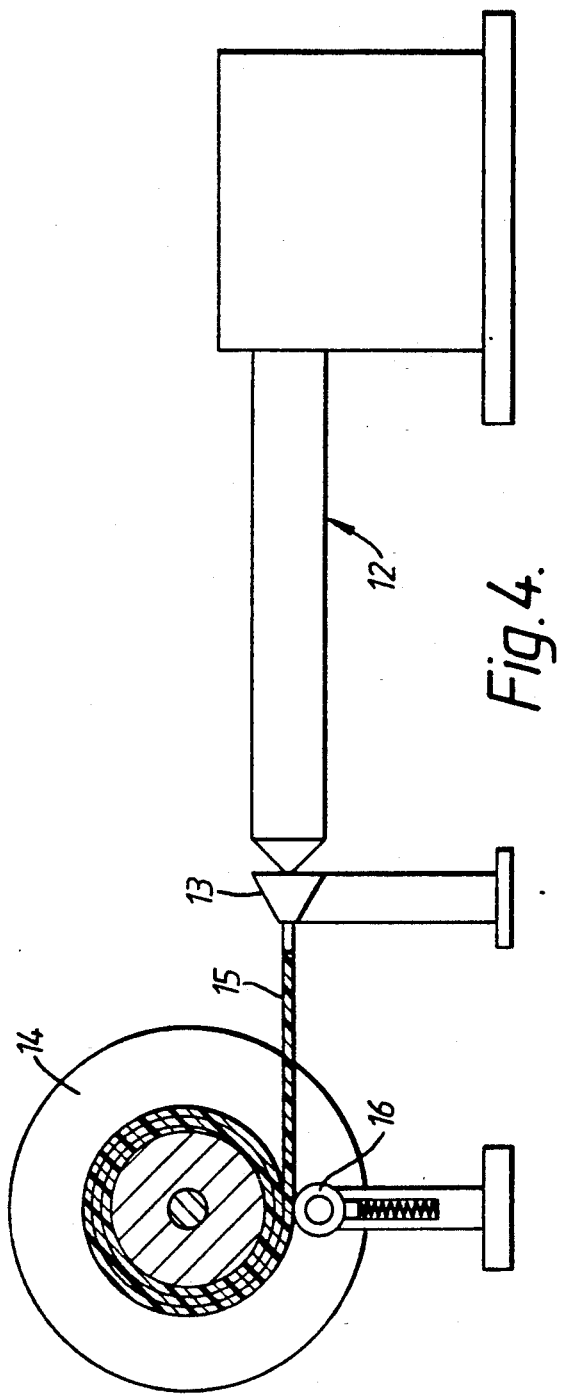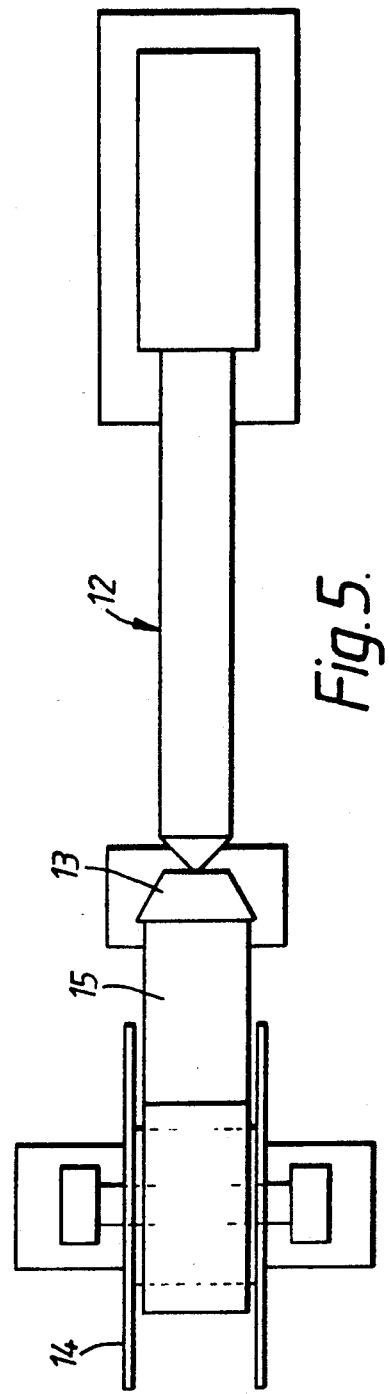

ELECTRO-FUSION FITTINGS

BACKGROUND OF THE INVENTION

This invention relates to electro-fusion fittings and their manufacture. Electro-fusion fittings are used for making couplings in thermoplastics, most commonly polyethylene pipe. The invention is particularly concerned with fittings intended for connecting two pipe lengths end-to-end, such fittings being frequently referred to as welding muffs or sleeves. Conventional welding sleeves consist of a hollow cylindrical body of thermoplastic material with a coil of electrical resistance heating wire at its inner surface. In use, the pipe ends are pushed into the opposite ends of the sleeve and an electric current is supplied to the heating coil so that the material of the pipes and fitting body is melted and fuses together to form a secure, leakproof coupling between the pipe ends.

Different methods can be employed for manufacturing electro-fusion sleeves. Most convenient in the case of sleeves of relatively small diameter, and hence having bodies of relatively small mass, is a technique wherein the body is produced by a normal injection moulding process. The heating wire, coated in the thermoplastic material, may be wound onto an injection mould core and then have the body injection moulded in situ over the wire coil.

This technique is not ideal for manufacturing large diameter fittings, however, because tooling costs are very high and the production rate is very low due to a long cycle time (in the order of 20 minutes) which arises through the time it takes to fill the mould cavity with molten plastic and the subsequent curing time necessary before the mould can be opened. As a solution to the problem of producing economically large diameter fittings, it has been proposed in GB-A-2036518 to form the body by cutting a length off from a pipe of thermoplastic material. The heating coil is applied to the interior of the pipe length by a process which involves: expanding the pipe length and introducing into it a mandrel onto which the wire, either bare or coated with thermoplastic material, has been wound; the pipe length is shrunk onto the mandrel and winding in a furnace; electric current is supplied to the heating wire to cause the wire turns to expand while the mandrel is expanded or shrinking of the pipe length is continued, and the thermoplastic material is caused to flow between the turns; and, after cooling, the wire ends are connected to contact pins previously mounted on the pipe length. Thus, the procedure is complicated and there still exists a need for a reliable and economic manufacturing method.

SUMMARY OF THE INVENTION

In accordance with one aspect the present invention provides an electro-fusion pipe coupler comprising an outer shell in the form of a selfsupporting cylinder, an electrical resistance heating winding comprising a coil of wire coated with thermoplastic material housed within the shell, and a layer of thermoplastic material moulded in situ between the winding and shell and securing the winding within the shell.

In such a construction, the main purpose of the outer shell is to impart the necessary strength to the fitting. While it is preferred that the shell is made from thermoplastic material, it may be possible for it to be made from other materials such as metal. This possibility exists because it may not be necessary for the shell to partake in the pipe welding process as the moulded thermoplastic layer, in combination with the wire coating material, may be adequate to ensure a leakproof joint between two pipe ends.

During the injection moulding step the shell constitutes an outer mould part confining the mould cavity with a core onto which the wire is wound. Consequently expensive moulding apparatus can be obviated. Even if the shell is made of thermoplastic material, an integral bond uniting the shell and injection moulded layer will not necessarily be obtained by the injection moulding process, although the two parts will be in direct face-to-face contact. In order to prevent the moulded layer breaking away or delaminating from the inner surface of the shell due to the shrinkage which tends to occur naturally during curing of the moulded material, it is preferable for the moulded layer to be formed at each end with an external projection in abutment with an axially outwardly facing shoulder defined by the shell. The shoulder could be defined by the end face of the shell, or by a rebate at the inner edge of the end face. Also, the shoulder could be inclined to the axis, or formed in some other way to provide a secure interlock with the moulded layer. However, very satisfactory results have been obtained with a radial shoulder defined by an annular groove machined in the inner surface of the shell at a small distance in from the end.

It is preferable for the moulded layer to extend axially from end to end of the shell. If the shell is made of thermoplastic material, however, two discrete layers could be possible, these layers being associated with winding portions arranged for cooperation with respective pipe ends during the welding procedure.

At each end of the coupler the lining formed within the shell by the moulded layer can conveniently be chamfered to provide a lead-in for the ends of the pipes to be coupled together.

A further advantage of the invention is that by limiting the amount of injected material, dimensional accuracy of the finished bore is more easily achieved.

According to another preferred feature, the coupler comprises a contact pin assembly extending through the wall of the shell and comprising an inner part held in place by the moulded layer, and an outer part connected to the inner part and providing a terminal portion. The inner and outer parts are joined releasably, e.g. by a threaded connection. This contact construction has certain advantages which will become clear from the description that follows.

In accordance with a second aspect the invention provides a method of making an electrofusion sleeve coupling comprising the steps of preparing a cylindrical shell, winding a coil of electrical resistance heating wire coated with thermoplastic material onto a mould core, inserting the core and winding thereon into the shell with a radial space defined therebetween, injecting thermoplastic material to fill the space, and removing the core so that the winding is retained in the shell by the moulded material.

The preparation of the shell preferably comprises machining the shell and thereby forming an axially outwardly directed shoulder adjacent each end thereof so that the layer of material subsequently moulded in situ inside the shell abuts against the shoulder for the purpose which has been explained above.

Conveniently, after inserting the core into the shell, a contact part can be attached to the wire end and introduced into a radial hole provided in the shell so that the contact part will be secured in place by the moulded material. During the moulding step the contact part can be secured in position by a fixing device engaged with the contact part from outside the shell. With the connections between the contact parts and wire ends embedded in the moulded material, they are protected and do not form protrusions against which the pipe ends may snag when they are inserted into the coupler.

The wire is preferably wound in two tightly wound sections in each of which the adjacent turns contact each other, with a link portion interconnecting these two sections.

The present invention is aimed mainly at the manufacture of large diameter electro-fusion fittings, but there is no reason why it should not be applied also to the production of smaller diameter fittings if desired.

Most conveniently the shell is prepared from a tubular blank, e.g. sawn off from an extruded thermoplastic pipe, or fabricated from an extruded ribbon as described in more detail hereinafter. The blank material is preferably the same as the injection moulded material, but this is not essential. The inner surface of the blank is machined to a uniform diameter but is left with a rough surface finish to provide a key to improve the adhesion of the moulded layer to the shell.

In accordance with a further aspect of the invention there is provided a mould core for use in manufacturing on electro-fusion sleeve, comprising two circular core parts, means for securing the core parts together to define an axially continuous cylindrical surface for receiving a winding of electric resistance heating wire, an inlet for molten plastic material in an outer end face of one core part, and an outlet for the molten material defined on the cylindrical surface at the interface between the core parts.

In a preferred core construction the inlet extends axially through the one core part and communicates with a plurality of radial runners defined between the two core parts and opening at respective outlets spaced apart around the cylindrical surface.

The outer surfaces of the core parts may be provided with means, e.g., circumferential rims or projections for holding the winding in place before and during the injection moulding process.

A clear understanding of the invention in its various aspects will be had from the following more detailed description given with reference to the accompanying drawings.

BRIEF DESCRIPTION OF THE DRAWINGS

FIG. 4 is a schematic longitudinal crosssection showing an apparatus for preparing a shell blank for manufacturing the fitting of FIG. 1;

FIG. 5 is a top plan of the apparatus shown in FIG. 4;

DETAILED DESCRIPTION OF THE PREFERRED EMBODIMENT

Figure 1:
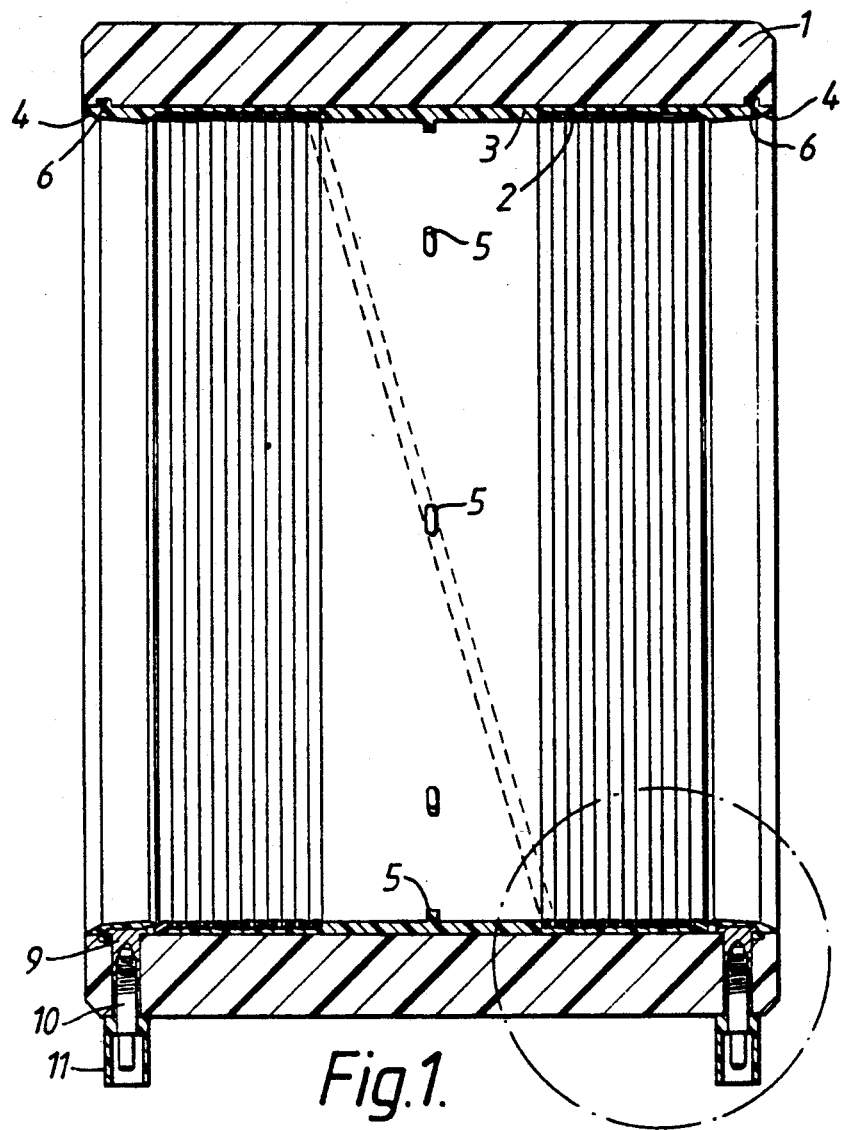
FIG. 1 is an axial cross-section through an electro-fusion sleeve fitting embodying the present invention.
Figure 2:
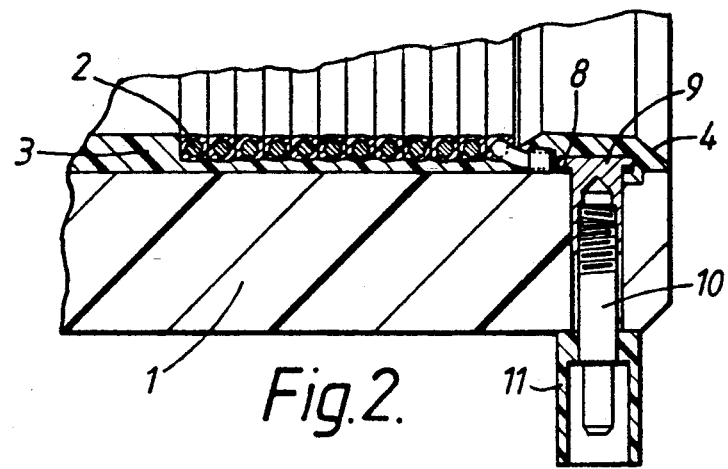
FIG. 2 is an enlarged detail showing that part of the fitting circled in FIG. 1.
Figure 3:
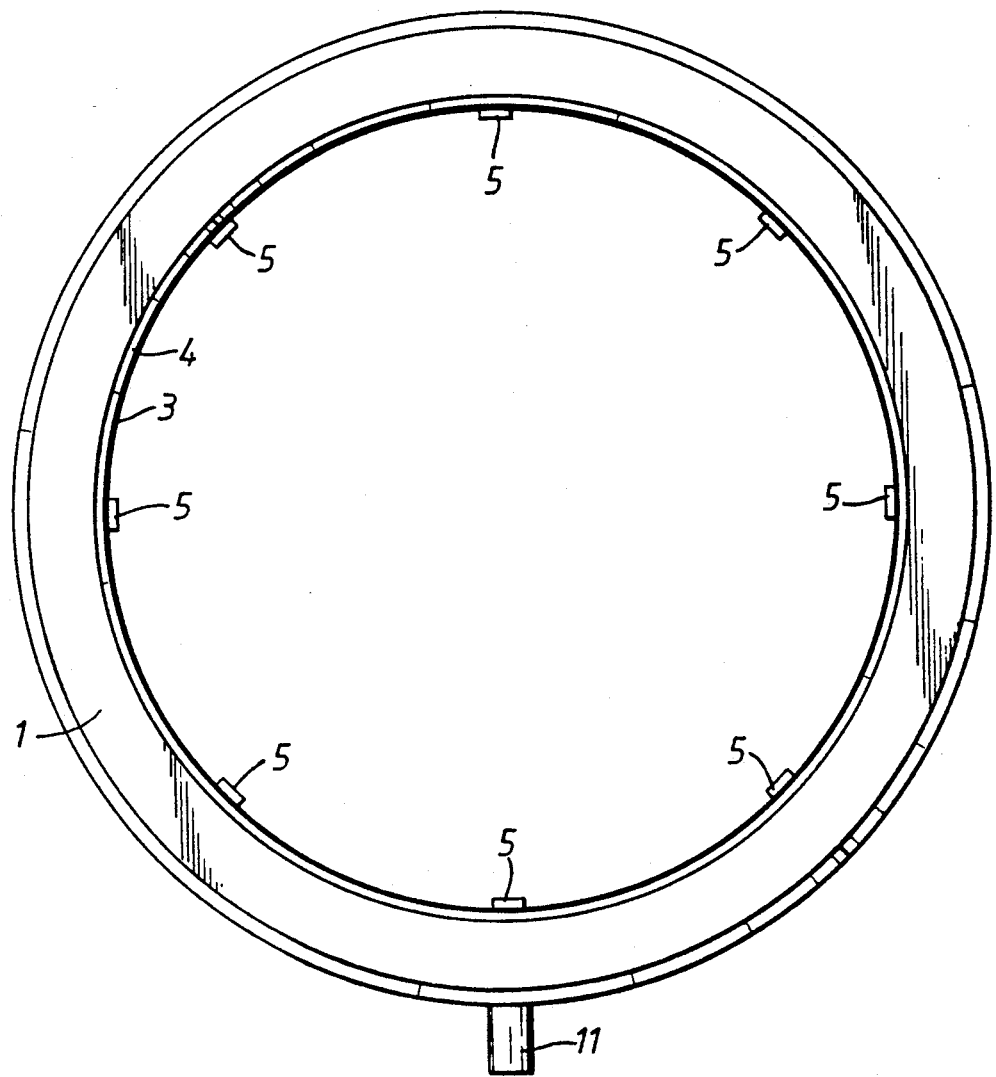
FIG. 3 is an end view of the fitting shown in FIG. 1.

Referring initially to FIGS. 1 to 3, there is illustrated a pipe coupler in the form of an electrofusion sleeve fitting. The body of the fitting consists mainly of a cylindrical shell or carcase 1 on the interior of which is arranged an electrical resistance wire winding 2 held in place by an intervening layer 3 of injection moulded thermoplastic material. The layer 3 extends from end-to-end of the shell and at its ends is formed with chamfered faces 4 defining a lead-in for each pipe end to facilitate insertion of the pipe ends to be joined into the sleeve. At the medial plane the layer 3 defines a plurality of circumferential spaced studs which project inwardly and define stops 5 for the pipe ends to abut against, thereby to ensure correct positioning within the sleeve in preparation for the welding process. At a small distance from each end an annular groove 6 of rectangular cross-section is machined in the shell 1 and the material of the layer 3 fills this groove to provide a mechanical interlock between the shell and moulded layer. This interlock prevents the layer 3 breaking away from the shell as a consequence of the radial and axial shrinkage effects which occur in the layer 3 while it is cooling as part of the injection moulding process.

The wire winding is wound in two coil sections which are contiguous due to an integral wire section linking them and depicted schematically in broken line in FIG. 1. The coil sections are arranged for cooperation with respective pipe ends in well known manner. The winding is formed from wire coated in thermoplastic material which is preferably the same material as that of the layer 3 and ideally also the same as the material of the shell 1. In each of the two coil sections the turns of the winding are arranged in a single layer and in abutment with each other. By virtue of being injection moulded in situ, the layer 3 adheres strongly to the shell and the coating of the wire winding, but it is not united therewith, that is, until the welding process when the heat generated in the winding by the electric current passed through it causes the thermoplastic material at the boundary faces to melt and fuse together, at least in the regions of the two coil sections, whereby a strong fusion bond is obtained between the outer surface of the pipe end in the sleeve, and the material of the wire coating, layer 3 and the shell 1.

The ends of the wire are connected to contact pin assemblies for connecting the winding to a source of electrical energy during the welding process. As may be best seen in FIG. 2, an eye connector 8 is attached to the wire end by crimping and an inner contact part 9 having an enlarged inner end extends through the eye and into a radial hole provided in the shell 1. The inner end of contact part 9 and the connector 8 are embedded in the layer 3 so that they do not form any obstruction to and will not be damaged by a pipe end being introduced into the welding sleeve. At its outer end the contact part 9 has a threaded connection, in particular a tapped core into which an outer contact part 10 is screwed. The contact part 10 comprises a pin onto which a plastic shroud 11 is fitted or moulded to surround an outer pin contact end, and the inner end of the pin is screw threaded for engagement with the inner contact part, as shown. During the pipe welding process the two pin contacts of the fitting are connected to an electric current source in well known manner.

Because the space between the shell 1 and the electrical winding 2 is filled by the layer 3, it is not necessary for the shell to be manufactured to close tolerances or to be expanded and/or shrunk while applying the winding into the shell. The shell could be prepared from a tubular blank cut from an extruded plastics pipe, but an alternative method of making a tubular blank is shown in FIGS. 4 and 5. A conventional plastics extruder 12 and an extrusion die 13 are used to produce a flat ribbon extrudate 15 of essentially rectangular section. The extrudate is led to a winding drum 14 and is wound onto the drum until the desired thickness has been built up. A pressure roller 15 is used to press the extrudate onto the underlying layers already on the drum to ensure close intimate contact. The cylindrical shell blank thus produced may be subject to annealing and is then machined ready for producing an electro-fusion fitting. The blank is machined over its inner and outer surfaces, including the machining of the grooves 6, and is drilled with the radial holes to accept the contact terminal assemblies. As already mentioned above, the shell can be made to large tolerances and the machining needs only to give the approximate dimensions. It is actually best for the inside surface to be machined to a relatively rough finish, e.g. to provide a helical ridge which increases the surface area, to improve the adhesion of the injection moulded layer to this surface.

Figure 6:
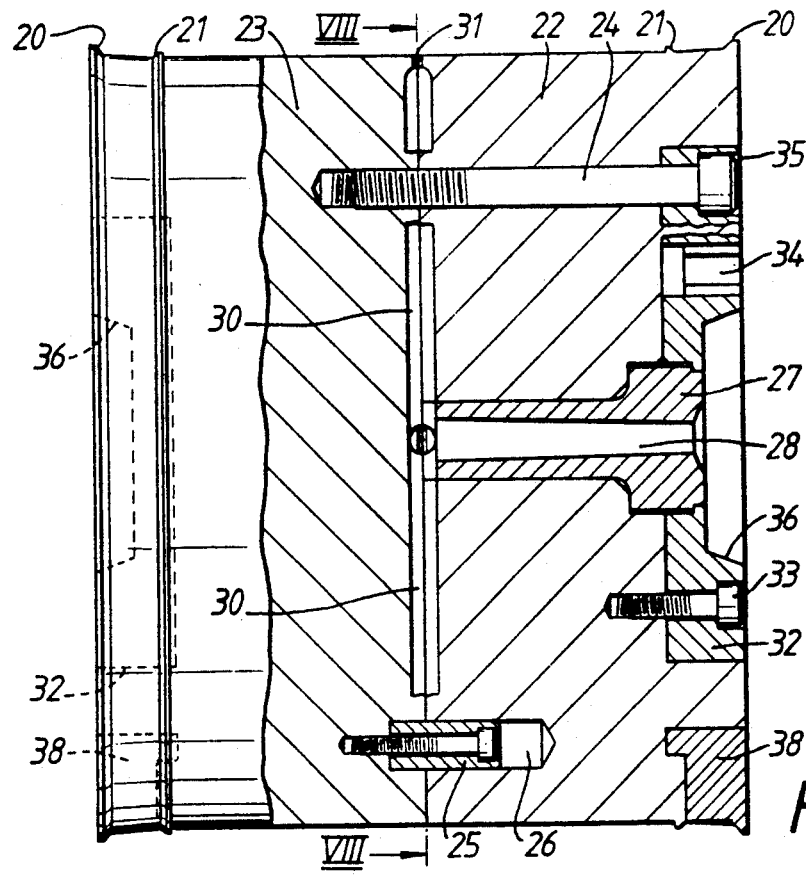
FIG. 6 is a side elevation, shown partially in section taken along the line VI—VI in FIG. 7, of a mould core for use in manufacturing the fitting shown in FIG. 1.
Figure 7:
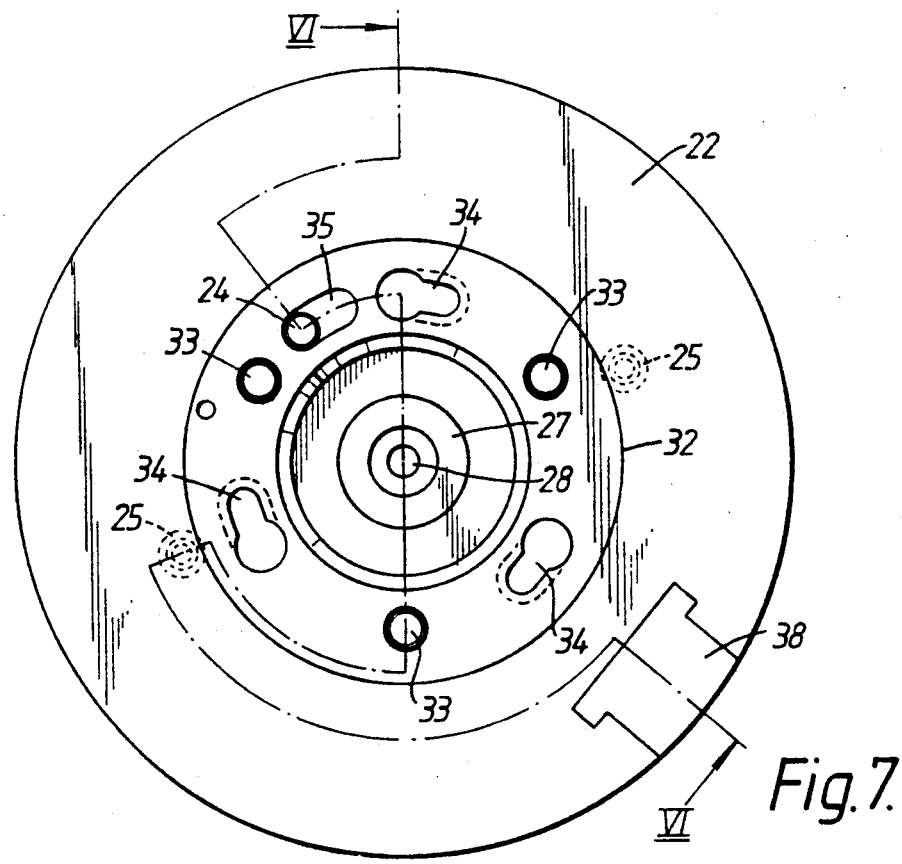
FIG. 7 is a right hand end elevation of the core shown in FIG. 6.
Figure 8:
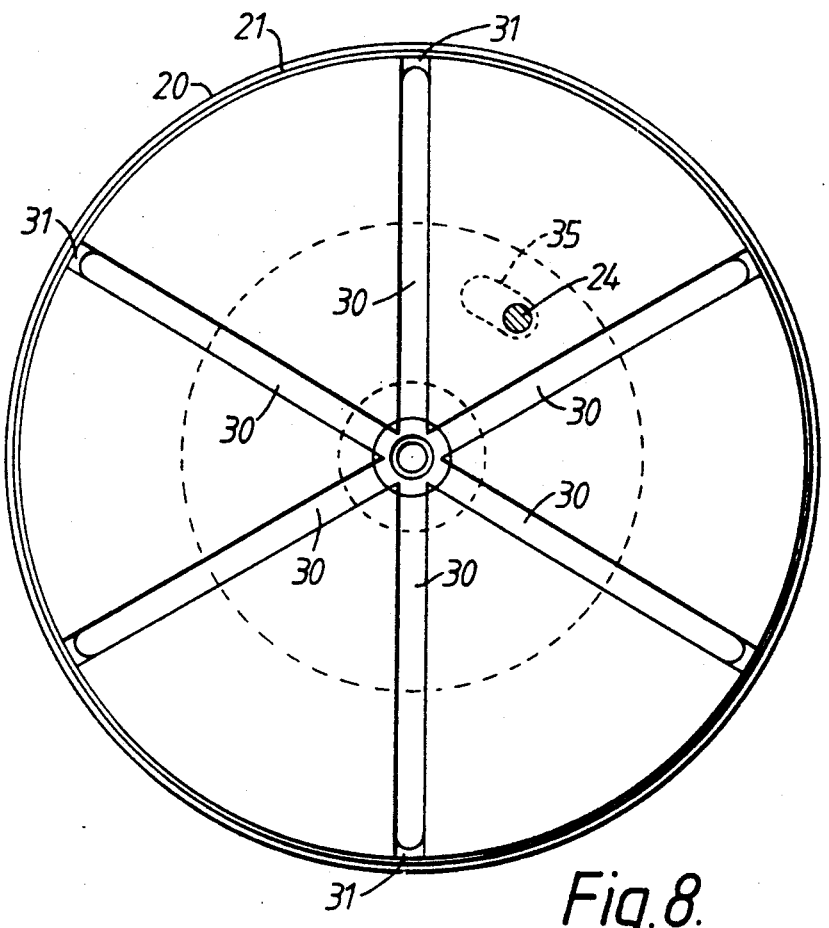
FIG. 8 is a section through the core taken along the line VII—VII in FIG. 6.

In the injection moulding step, i.e., during the formation of the layer 3, the shell 1 constitutes an outer mould part delimiting the mould cavity with a mould core. The core is shown in FIGS. 6 to 8, but it should be noted that FIG. 6 is not a true section insofar as some parts, mainly bolt 24 and dowels 35, are shown out of true position for ease of illustration. The core has an outer cylindrical surface with circumferential end rims 20 for producing the chamfer faces 4 as described above. Spaced a short distance in from the rims are further circumferential projections 21 which define axially inwardly directed radial stop shoulders which serve to locate the outer ends of the respective heating coil sections and to hold them in position during injection of the moulding material. The core is made in two axial halves 22, 23 which are held together by a detachable bolt 24. To ensure correct coaxial alignment between the core halves, the core half 23 is equipped with two diametrically opposed location dowels 25 which enter corresponding bores 26 in the core half 22 when the two halves are brought together. The core half 22 is equipped with an axial sprue bush 27 defining an inlet channel 28 for the moulding material, the inner end of the channel opening into six radial runners 30 uniformly distributed around the axis and having gates 31 opening at the cylindrical surface of the core. The runners are confined between the confronting faces of the core halves and have their gates shaped for producing the stops 5 mentioned above. Accommodated in recesses in the outer end faces of the core halves are extraction plates 32 fixed in position by bolts 33. In each plate 32 there are three key-hole shaped slots 34 which are undercut behind their narrow portions enabling enlarged heads of an extraction tool to be inserted and by a small angular rotation be securely locked to the extraction plate and hence the core half. With extraction tools so engaged with the two core halves they can be pulled apart and in opposite directions out from a completed electrofusion fitting, the bolt 24 having been removed first of course. It will be noted that the head of bolt 24 is located in a slot 35 in the extraction plate of core half 22. The corresponding extraction tool has a projection arranged to enter this slot and if the bolt 24 has not been removed the extraction tool cannot be engaged with the extraction plate. For support and correct positioning of the core within the injection moulding machine, the extraction plates are provided with tapered location recesses 36. It will be noted that the sprue bush is fixed in the core half 22 by its extraction plate 32.

The core halves are formed with removable core segments 38. When the core is inserted into the shell these segments, or at least the spaces they normally occupy, are positioned opposite the holes provided in the shell to receive the contact terminal assemblies, for reasons which are explained below.

Figure 9:
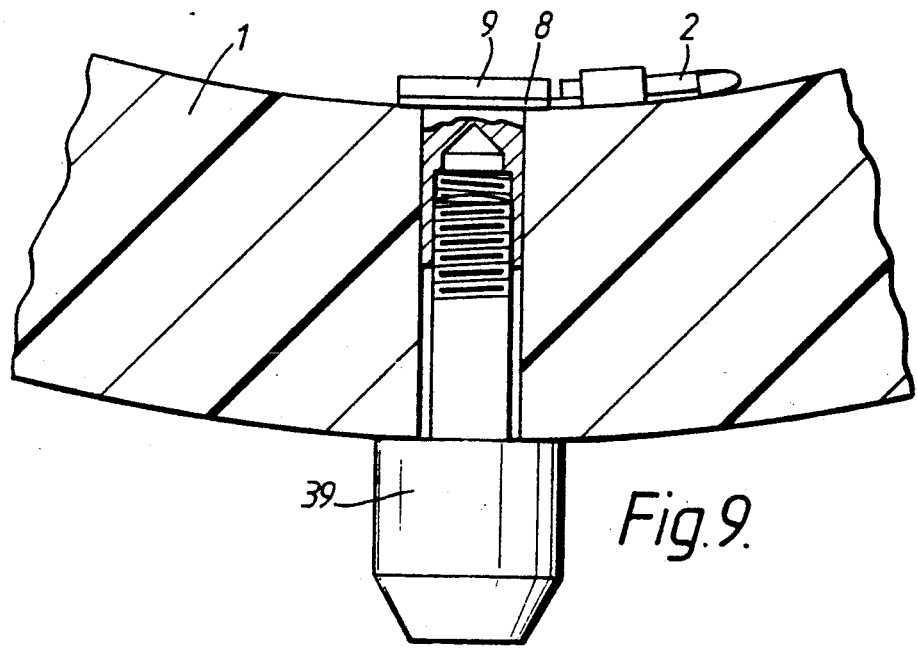
FIG. 9 is a transverse section illustrating an electrical contact assembly prepared ready for the injection moulding step.

With the core assembled as shown in the drawings, the coated electrical resistance wire is wound onto the core to form the two coil sections, respectively abutting with their outer ends the stop faces of rims 21, with the wire ends being left protruding at the position of the removable core segments 38. The core and winding are inserted axially into the previously prepared shell. The segments 38 are removed so that the eye connectors 8 can be crimped onto the wire ends, and the inner contact parts 9 are inserted through the eyes and into the holes in the shell. To secure them firmly during the injection moulding process, a mould tool bung 39 (FIG. 9) generally formed as a bolt is screwed into each contact part 9 and serves to clamp it firmly against the interior surface of the shell. The segments are then replaced and the entire assembly of shell and core is loaded into a suitable injection moulding machine. The thermoplastics material is injected through the sprue bush and enters the cavity confined between the shell 1 and core via the runners 30 and gates 31 to fill this space and thereby form the layer 3 for holding the winding on the interior surface of the shell. After an appropriate curing time, the assembly is removed from the moulding machine and the core halves 22, 23 can be removed by extraction tools engaged with the core halves as explained above. All that remains to complete the fitting is to remove the mould tool bungs 39 and insert in their place the outer contact parts 10. If preferred, to remove any risk of damage during storage and/or transportation, the outer contact parts may be fitted only when the electro-fusion is ready to be used to produce a welded pipe joint. It will be noted that apart from being convenient from a manufacturing viewpoint the two-part contact assembly has the advantage that different outer contact parts could be applied, e.g., to suit the particular contact configurations of different control devices which may be used to supply electric power to the fitting.

It will be understood that modifications are possible without departing from the scope of the invention. Hereby as an example it is mentioned that other forms of connector may be used to connect the wire ends to the contacts, rather than the eye connectors shown and described, or if the contacts are suitably made a direct connection with the wire is possible. Thus the wire end could be inserted into a transverse bore provided in the inner end of contact part 9 and be securely clamped therein by a grub screw screwed into the tapped core of part 9 ahead of the outer contact part 10.

I claim:

1. An electro-fusion pipe coupler for connecting end-to-end two pipe lengths, the coupler comprising a cylindrical body and a bore extending through the body from one end to the other end thereof to receive end portions of the two pipe lengths inserted into the respective ends of the body, the body comprising a prefabricated outer shell having the form of a self-supporting cylinder of substantially constant diameter, an electrical resistance heating winding housed in the shell, said winding comprising a coil of wire coated with thermoplastic material, and a layer of thermoplastic material injection moulded in situ between the winding and said prefabricated outer shell and securing the winding within said prefabricated outer shell.

2. A pipe coupler as claimed in claim 1, wherein the wire coating and said layer are made of the same thermoplastic material.

3. A pipe coupler as claimed in claim 1, wherein said outer shell is made of thermoplastic material.

4. A pipe coupler as claimed in claim 3, wherein said outer shell and said layer are made of the same kind of thermoplastic material.

5. A pipe coupler as claimed in claim 4, wherein said thermoplastic material is polyethylene.

6. A pipe coupler as claimed in claim 3, wherein said outer shell comprises a length of pipe cut from an extruded thermoplastic pipe.

7. A pipe coupler as claimed in claim 3, wherein said outer shell is formed from several layers of extruded thermoplastic ribbon wound continuously, layer upon layer.

8. A pipe coupler as claimed in claim 1, wherein the moulded thermoplastic layer extends along substantially a full length of said outer shell.

9. A pipe coupler as claimed in claim 8, wherein the thermoplastic layer is formed with a chamfered face at each end thereof for guiding pipe ends to be joined into the coupler.

10. A pipe coupler as claimed in claim 8, wherein said outer shell has opposite ends and defines respective shoulders herein adjacent said opposite ends, the shoulders being directed generally axially away from the winding, and wherein said moulded thermoplastic layer includes external projections which respectively abut said shoulders.

11. A pipe coupler as claimed in claim 10, wherein each said shoulder is defined by a circumferential groove in an inner surface of said outer shell.

12. A pipe coupler as claimed in claim 1, including a hole in said outer shell and a contact assembly extending through said hole and comprising an inner contact part to which an end of the winding wire is secured and an outer contact part connected to the inner part and providing a terminal portion.

13. A pipe coupler as claimed in claim 10, wherein the inner contact part is held in position by the moulded thermoplastic layer.

14. A pipe coupler as claimed in claim 10, wherein the inner and outer contact parts have a releasable connection with each other.

15. A pipe coupler as claimed in claim 1, wherein said layer of thermoplastic material is adhered to both said winding and said prefabricated outer shell.

* * * * *